Figure 1:
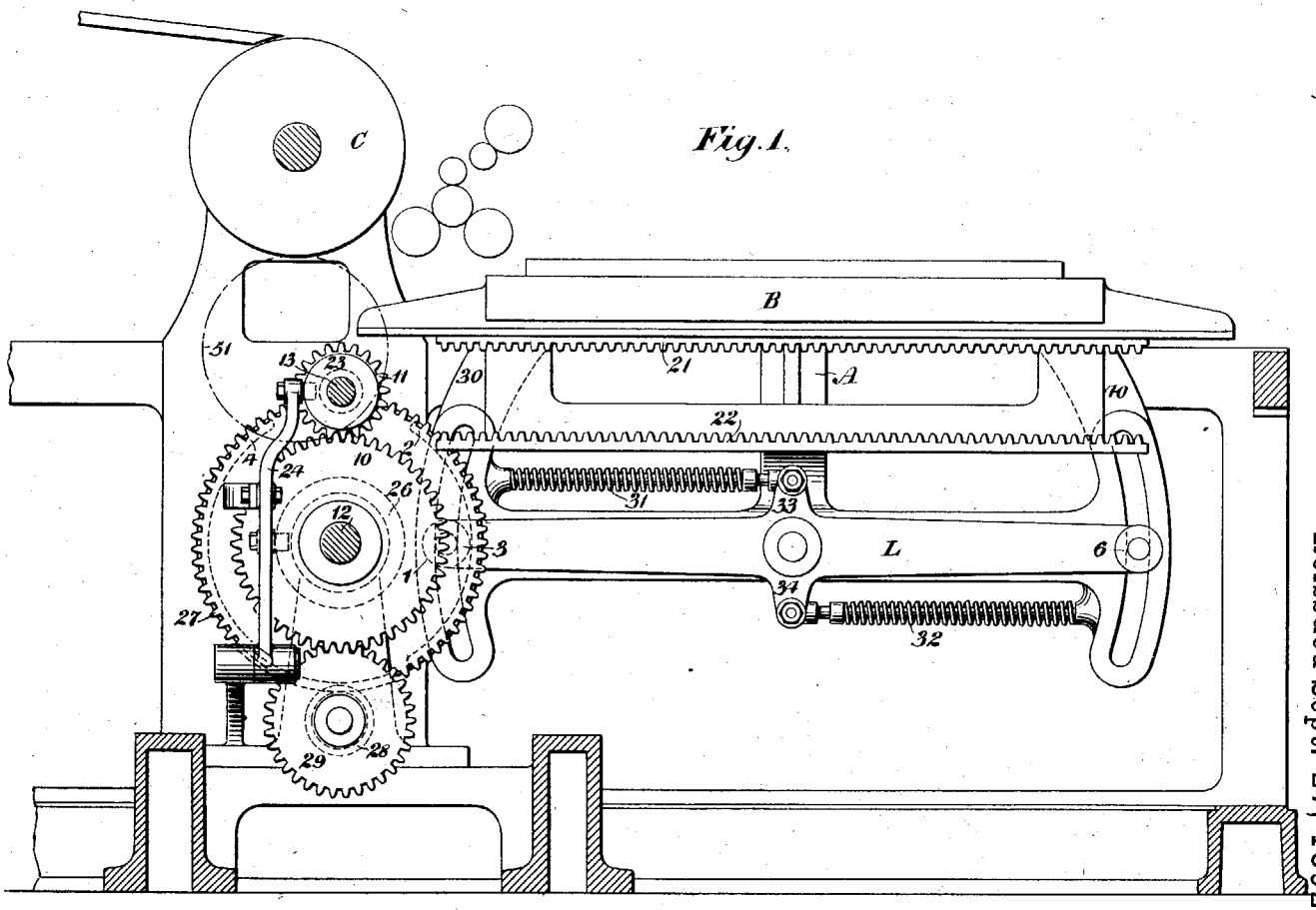

6 Sheets—Sheet 1.

L. C. CROWELL.

Assignor to R. Hoe, S. D. Tucker, T. H. Mead & C. W. Carpenter.

BED MOTION FOR CYLINDER PRINTING MACHINES.

No. 11,273. Reissued Sept. 27, 1892.

Witnesses:
Edward Thorpe
J. J. Kennedy

Inventor:
Luther C. Crowell
By Philipp Munson & Shelp
Atty's.

L. C. CROWELL.

Assignor to R. Hoe, S. D. Tucker, T. H. Mead & C. W. Carpenter.

BED MOTION FOR CYLINDER PRINTING MACHINES.

No. 11,273. Reissued Sept. 27, 1892.

Witnesses:
Edward Thorpe.
D. Kennedy

Inventor:
Luther C. Crowell
By Philipp Munson & Phelps
Att'ys.

6 Sheets—Sheet 3.

L. C. CROWELL.

Assignor to R. Hoe, S. D. Tucker, T. H. Mead & C. W. Carpenter.

BED MOTION FOR CYLINDER PRINTING MACHINES.

No. 11,273. Reissued Sept. 27, 1892.

Witnesses:
Edward Thorpe.
J. J. Kennedy

Inventor:
Lucher C. Crowell
By Pheiffer Kenyon & Pheiffer
Atty's.

L. C. CROWELL.

Assignor to R. HOE, S. D. TUCKER, T. H. MEAD & C. W. CARPENTER.

BED MOTION FOR CYLINDER PRINTING MACHINES.

No. 11,273. Reissued Sept. 27, 1892.

*Witnesses:*
Edward Thorpe.
J. J. Kennedy

*Inventor:*
Lucher C. Crowell
*By* Philip Munn & Phelps
*Att'ys.*

L. C. CROWELL.

Assignor to R. HOE, S. D. TUCKER, T. H. MEAD & C. W. CARPENTER.

BED MOTION FOR CYLINDER PRINTING MACHINES.

No. 11,273. Reissued Sept. 27, 1892.

*Witnesses:*
*Edward Thorpe.*
*J. J. Kennedy*

*Inventor:*
*Luther C. Crowell*
*By Pfleiff Munson & Pfleiff*
*Atty's.*

L. C. CROWELL.

Assignor to R. HOE, S. D. TUCKER, T. H. MEAD & C. W. CARPENTER.

BED MOTION FOR CYLINDER PRINTING MACHINES.

No. 11,273. Reissued Sept. 27, 1892.

*Witnesses:*
*Edward Thorpe.*
*J. J. Kennedy*

*Inventor:*
*Lucher C. Crowell*
*By Chas. H. Hammond Pltf.*
*Atty's.*

UNITED STATES PATENT OFFICE.

LUTHER C. CROWELL, OF BROOKLYN, ASSIGNOR TO ROBERT HOE, STEPHEN D. TUCKER, THEODORE H. MEAD, AND CHARLES W. CARPENTER, ALL OF NEW YORK, N. Y.

BED-MOTION FOR CYLINDER PRINTING-MACHINES.

SPECIFICATION forming part of Reissued Letters Patent No. 11,273, dated September 27, 1892.

Original No. 480,321, dated August 9, 1892. Application for reissue filed August 30, 1892. Serial No. 444,595.

*To all whom it may concern:*

Be it known that I, LUTHER C. CROWELL, a citizen of the United States, residing at the city of Brooklyn, county of Kings, and State of New York, have invented certain new and useful Improvements in Bed-Motions for Cylinder Printing-Machines, fully described and represented in the following specification and the accompanying drawings, forming a part of the same.

The present invention is constituted by improvements upon that shown in Letters Patent No. 5,200, granted to Richard M. Hoe July 24, 1847, and relates to that class of printing-machines which have reciprocating type-beds that co-operate with rotating cylinders in making the impression, whether said machines have one or more such cylinders and whether said cylinder or cylinders oscillate or rotate periodically or continuously or in the same or opposite directions or make one or any number of revolutions during each reciprocation of the type-bed. In short, the invention applies to a machine having a reciprocating bed, no matter how the impression is taken therefrom, although it is illustrated in connection with a single-cylinder printing-machine.

The object of this invention is the providing of a mechanism for retarding and stopping the movement of the bed in one direction and starting and accelerating it in the reverse direction at each end of its run, which shall perform these reversing operations so quickly as to minimize the time for their accomplishment, and thus provide for the attaining of the highest rate of speed of the machine without unduly modifying it in making such reversals of the bed at the ends of its stroke.

The invention consists in combining with a rack and pinion or other means producing the major part of the movement imparted to the bed a swinging lever provided with a stud which is engaged near the end of the movement of the bed in one direction by a pocket in the periphery of a revolving disk and carried by said pocket through a curved guideway provided by a rotating curved guard, which movement of the lever-stud thus caused in said curved guideway is equivalent to that of a crank, and hence operates to cause the reversal of the bed by a movement which is both powerful and smooth.

The invention also embraces such a lever made double and provided at each end with a stud, one of which studs is engaged at each end of the movement of the bed by the said pocket and carried thereby through the curved guideway provided by the rotating guard in the performance of the reversing operations at each end of the run of the bed.

The invention also includes, in combination with the foregoing, a curved guide or guides attached to the bed, in which guide or guides the stud or studs on the end or ends of said lever are forced to travel in an arc that is opposed to that traveled by the pocket and from which results a compound movement that is an extended path, which produces a cam-like action, enabling the bed to be retarded and stopped so smoothly as to avoid jarring and to be started and accelerated with great ease.

The above constitute the most prominent features of the invention. Other improvements, however, will appear in the course of the following detailed description of the mode in which the invention is practically embodied or carried into effect, a ready understanding of which will be aided by reference to the accompanying drawings, in which—

Figure 2:
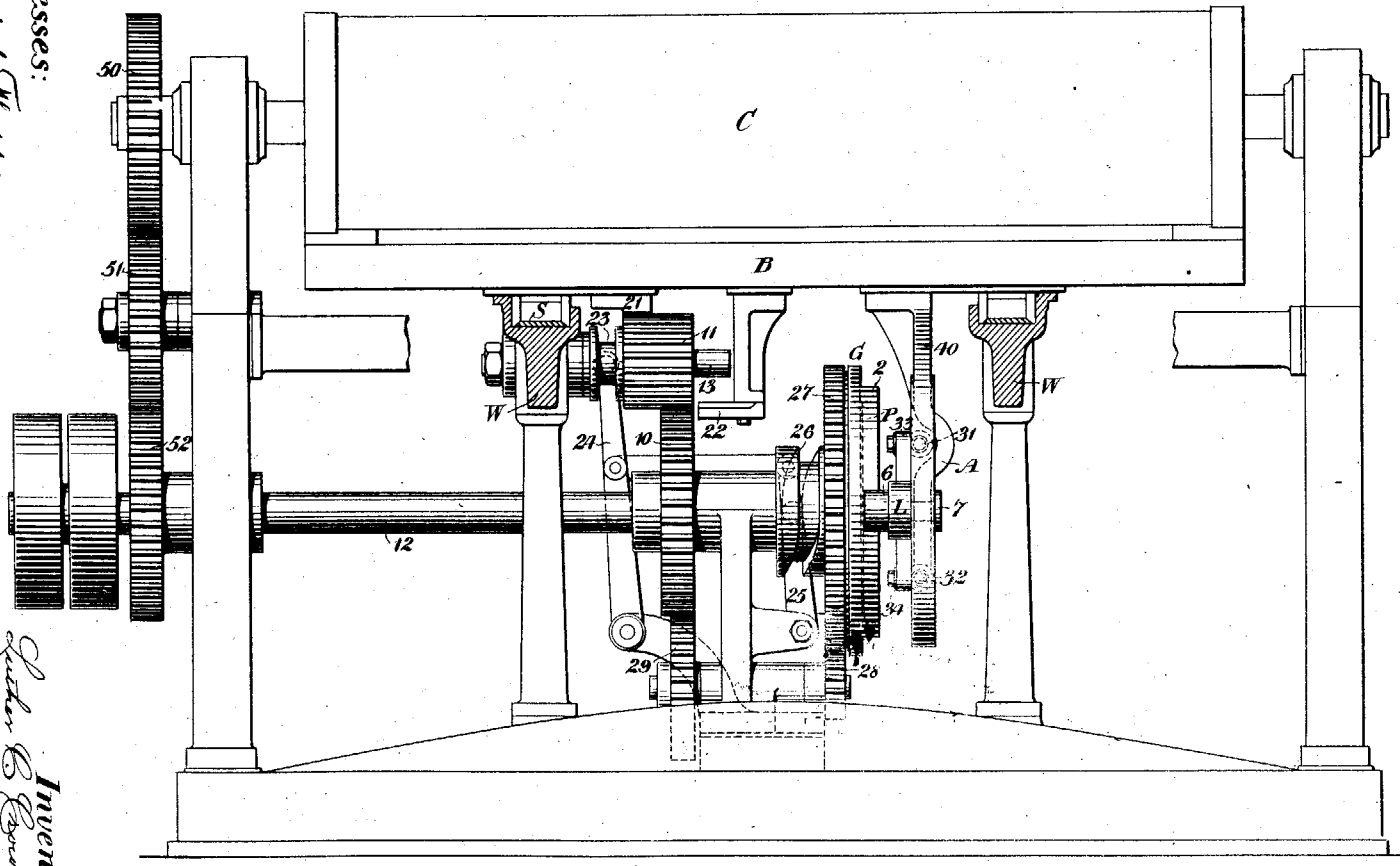
Figure 3:
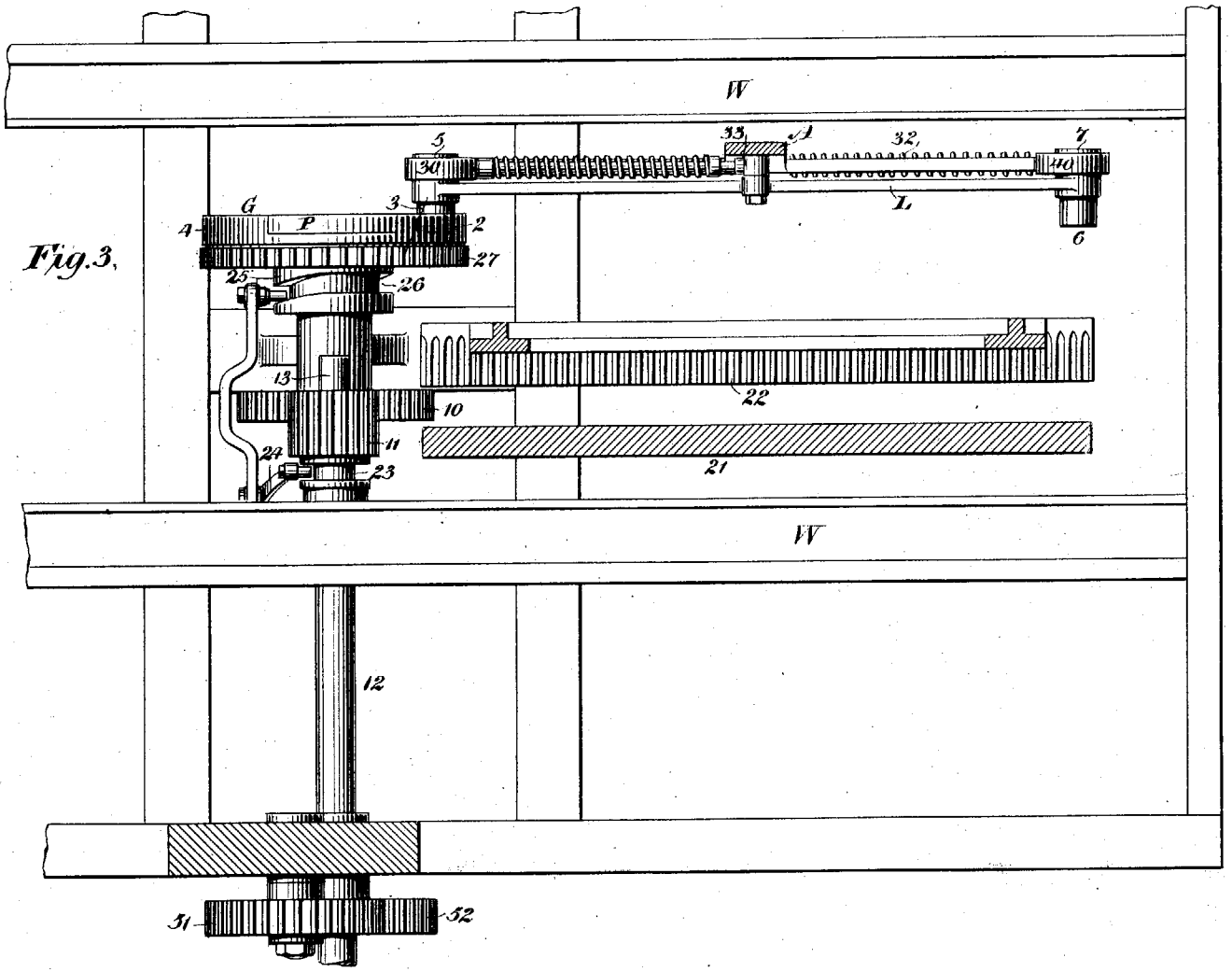
Figure 3:
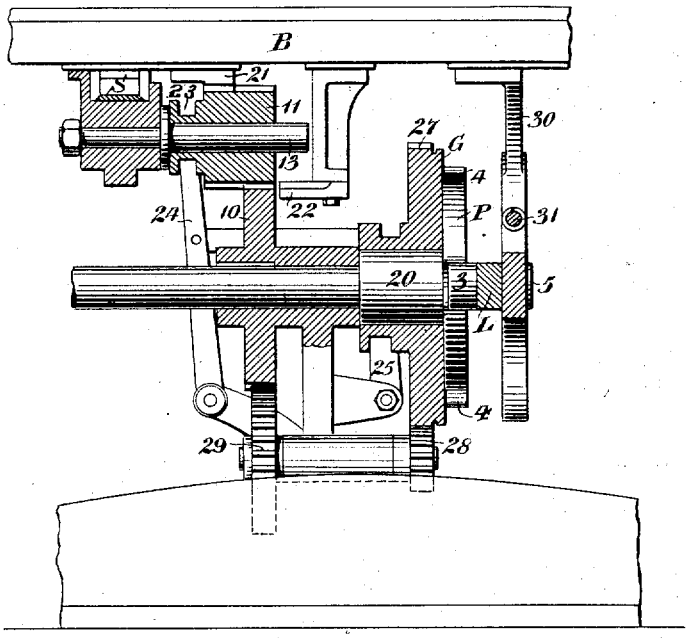
Figure 4:
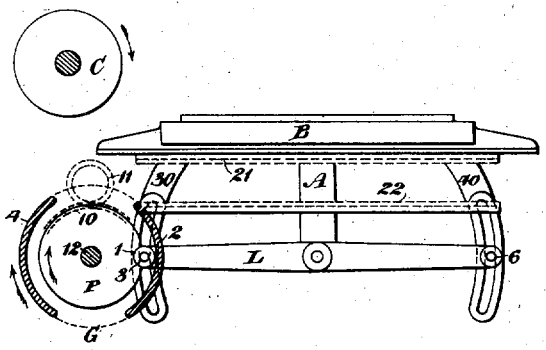

Figure 1 is a side elevation, Fig. 2 an end elevation, and Fig. 3 a plan view, of a printing-machine embodying the present improvements, while Fig. 3* is a vertical sectional elevation taken through the driving-pinion shaft; and Figs. 4, 5, 6, 7, 8, and 9 are diagrams illustrating various positions assumed by the retarding, stopping, starting, and accelerating mechanisms during the operations of reversing the bed.

The printing-machine illustrated comprises the usual impression-cylinder C, mounted to revolve in suitable journals supported by the framework, which cylinder co-operates with a reciprocating type-bed B, that is supported by sliders S, which run in longitudinal ways W, supported by the framework. This cylinder C is rotated by means of an outside train consisting of wheel 50, driven through an intermediate 51 from a wheel 52 on a shaft 12. This shaft 12 also carries what is usually referred to as the "main driving-pinion" 10, because it determines the movements of the bed-driving pinion 11, said pinion 10 usually making, as it does in this instance, three revolutions to each reciprocation of the bed; but, though experience has demonstrated such a size and relative movement to be advantageous, its relative movement may be changed without affecting the present improvements, as may also the construction and arrangement of the rack-and-pinion mechanisms.

The bed-driving pinion 11 is mounted to turn freely upon a short shaft 13, upon which it is arranged to slide to such extent laterally as to be alternately meshed with the bed-racks 21 22, it being made wide enough to continue in gear with the pinion 10, which constantly drives it. These racks 21 22 are supported directly from the under side of the bed B, and they are vertically aligned, so as to be separated a suitable distance apart and horizontally related to the pinion 11, so that their pitch-lines respectively agree with the pitch-lines at the top and bottom of said pinion. Timely sliding movements of this pinion 11 on its shaft 13 are imparted by means of a collar 23, attached thereto, into which is entered one end of a pivoted lever 24, that is strapped to another pivoted lever 25, which latter is periodically vibrated by means of a cam 26, that is fast to the guard-disk G and revolves with it on the shaft 12. This shaft 12 carries at its inner extremity a revolving pocket-disk P, having a pocket 1. In Fig. 3* this shaft and the pocket-disk are shown in elevation for the sake of clearness, and said pocket 1 is occupied in said figure by the stud 3. This pocket-disk is provided with a hub 20, which embraces the shaft 12 and is secured fixedly thereto by means of a spline. This shaft 12 also supports a revolving guard-disk G, which is mounted to turn freely upon said hub 20, carries at its rear side the cam 26, and has its periphery provided with teeth, forming a gear-wheel 27, by which motion is imparted to it and said cam through intermediate pinions 28 and 29 from the main driving-pinion 10, which intermediate pinions are so proportioned to said pinion 10 and guard-disk G that the rotation of the cam and the guard-disk are relatively slower than the pinion 10 for an object yet to be explained. On its face side this guard-disk carries the guard 2, within which the pocket-disk P revolves, said guard thus overhanging the pocket-disk and co-operating, as will yet appear, to embrace the stud 3 or 6 between it and the pocket-disk, and thus cause said stud to travel in the circular path thus provided. The pocket-disk makes turn for turn with the pinion 10, and, being of like size, has a corresponding surface speed. It thus results from the relative proportions of the gearing that the pocket-disk P makes three revolutions to one of the guard-disk G.

The type-bed B is provided with a swinging lever L, centrally pivoted to an arm A, depending from the bed, and said bed carries depending at its opposite ends outwardly-curved arms 30 and 40, in which the free ends of said lever are respectively guided. Each end of this lever is provided at one side with a stud, as 3 or 6, that is periodically entered into the pocket 1 of the disk P and engaged with the curved guard 2 of the disk G, said pocket 1 and the guard 2 forming a curved pathway in which the stud 3 or 6 on the lever L is driven by the rotation of the pocket-disk P, and as this pathway is like that traveled by a crank it consequently imparts the controlling motion of a crank to the reversing of the bed. On the opposite side each end of the lever is provided with a stud, as 5 or 7, that travels in the pathway of or is otherwise guided by the arm, as 30 or 40. Said crank motion is thus supplemented by what is tantamount to a cam motion, for the reason that the stud 5 or 7 on the lever end travels in a guideway the arc of which is opposed to that in which said lever end is moved by the action of the pocket-disk and guard 2, and such compound movement renders it possible to slow down and stop the bed with great smoothness and to restart and propel the same with great ease.

Figure 5:
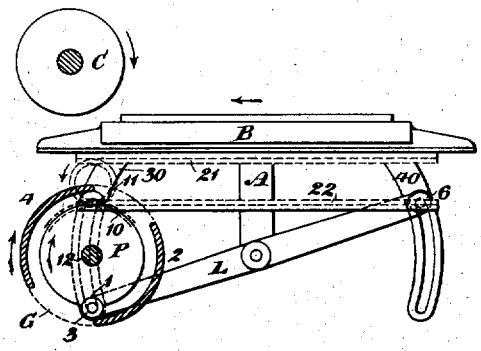
Figure 6:
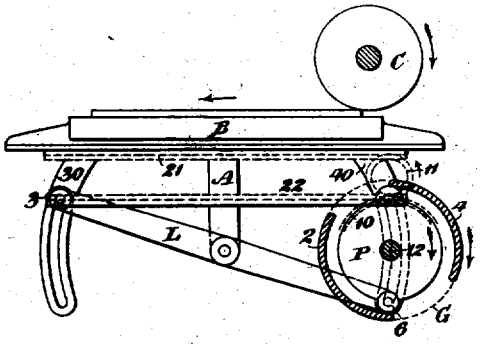
Figure 7:
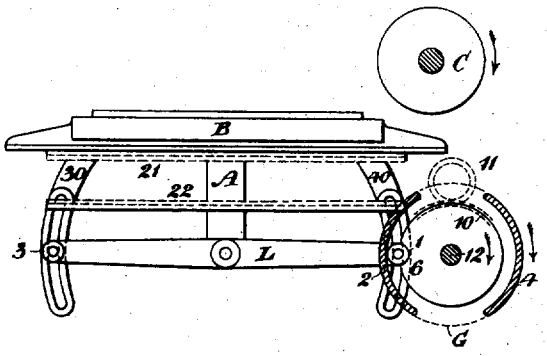
Figure 8:
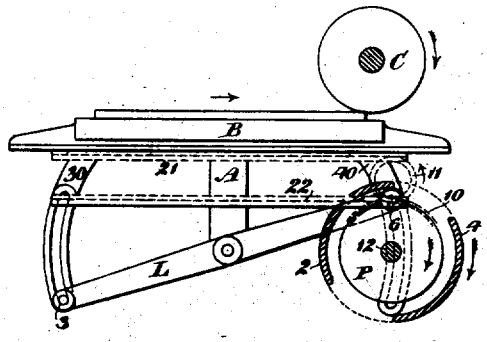
Figure 9:
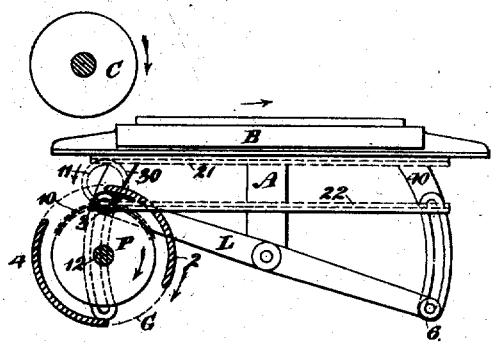

As the stud 3 upon the lever L must enter the pocket 1 in the disk P when it is approaching and passing its highest point of travel (see Fig. 9) and must leave the said pocket when it is approaching and passing its lowest point of travel, as in Fig. 5, which movement would leave the lever L tilted up, with its stud 6 in its highest position, and as said stud 6 must enter said pocket when it is approaching and passing its lowest point of travel, as in Fig. 6, and must leave the pocket when it is approaching and passing its highest point, (see Fig. 8,) which movement would leave said lever so tilted as to depress the stud 3 in its lowest position, it follows that said lever must be reversed after each such operation and assume its normal position of Figs. 6 and 9 in order to present its stud properly to the action of said pocket and to the guard before another such operation is to be made. This is accomplished by means of spring-seated rods, as 31 and 32, pivoted to bosses 33 34 on opposite sides of the central part of the lever L and arranged to press inwardly from the rear of the curved guide-arms 30 40, by the operation of which spring-rods said lever will as its one stud, as 3, has cleared the pocket 1 and guard 2 when in the lowest position to which it is rocked be depressed, so as to carry the stud 6 upon its other end down into proper position for the making of a like performance, and vice versa. This and all of the movements of the other parts will be made clear by the following description of the operation, in connection with the diagrams Figs. 4 to 9, wherein various parts, which would obscure others then active, are either broken away or shown in lines or dotted lines.

In the position shown in Fig. 9 the parts are in the positions which they have when the bed, having made the major part of its non-printing or return run, driven by the rack-and-pinion mechanism in the direction indicated by the horizontal arrow, is to have that movement completed to a state of rest and then be started and moved in the reverse direction, or that in which it runs when co-operating with the cylinder in making an impression. It being understood that the pocket-disk P and the guard-disk G turn in the same direction—that of the curved arrow—that the surface speed of the pocket-disk is equal to that imparted by the rack-and-pinion mechanism to the bed, and that the speed of the guard-disk is slower than that of the pocket-disk, the latter making three revolutions while the guard-disk makes one, it will be apparent, since the rear end of the guard 2 coincides in position with that of the pocket 1 when the latter is in its highest position, that while the pocket-disk makes a half-revolution to bring its pocket 1 into its lowest position the forward end of the guard 2 will arrive simultaneously at the same point, said guard being thus in position for the timely entrance and exit of the stud 3, and, furthermore, that this guard 2 will perform in a like manner with respect to the stud 6 on the lever L. It will also be observed that during the reversing operations the pinion 11 is moved laterally to bring it into the path of travel of the rack with which it is next to be engaged. As the pocket 1 is closely approaching and passing its highest point and the tail of the guard 2 coincides in position with it, as in Fig. 9, at which time said pocket, the rack 22, and stud 3 are moving at the same surface speed as the driving-pinion, the rack 22 will run out of the pinion 11 and the stud 3 will simultaneously enter the pocket 1 and pass behind said guard 2, and while the pocket makes a quarter-revolution it will carry the stud 3 in the curved or crank pathway formed by the guard 2 and compel the stud 5 to travel in the reversed curved pathway in the arm 30, and thus through a compound movement gradually retard the bed and bring it to a momentary state of rest, as in Fig. 4, which compound movement thus obtained is cam-like or of greater and hence easier sweep than is the movement imparted through a semicircular path or that traveled by a crank alone. During the next quarter-revolution of said pocket 1, in co-operation with said guard 2 and pathway in arm 30, it will continue to move the stud 3 in like manner, thus starting the bed in the reverse direction and gradually accelerating it through such compound motion, and when the pocket 1 is closely approaching and passing its lowest point of travel and the forward end of the guard 2 coincides with it, as in Fig. 5, at which time said pocket, the rack 21, and the stud 3 are moving at the same surface speed as the driving-pinion 10, the rack 21 will engage the pinion 11, which has been moved into alignment with it, and the stud 3 will simultaneously disengage from the pocket 1 and pass out from the forward end of the guard 2. The bed will then have been reversed by the action of the pocket 1 and guard 2, applied through the studs 3 and 5 and arm 30, and will now be driven solely by the pinion 11 and rack 21 through the principal portion of the printing run, during which the stud 3, having left the guard 2 and smoothly disengaged the pocket 1, will leave the guard 2 and become free to run on unobstructedly carried by the bed. The principal part of this printing run will then be completed by the pinion 11 while the pinion 10 is making a complete revolution, which will bring the parts into the position shown in Fig. 6, ready to begin the reversing operation, and since during this printing run or single revolution of pinion 10 the spring-rods 31 32 will have vibrated the lever L, so as to depress the lever, its stud 6 will now be presented in the lowest position properly aligned to enter the pocket 1 and be carried between it and the guard 2. When the said pocket 1 is again closely approaching and passing its lowest point of travel and the tail of the guard 2 coincides in position with it, as in Fig. 6, at which time said pocket, the rack 21, and stud 6 are moving at the surface speed of the driving-pinions 10 11, the rack 21 will leave the pinion 11 and the stud 6 will simultaneously enter the pocket 1 and pass behind the said guard 2, and while the pocket 1 is making a quarter-revolution it will carry the stud 6 in the curved or crank pathway formed by the guard 2 and compel the stud 7 to travel in the reversed curved pathway in the arm 40, thus through a compound movement imparting to the bed a motion which gradually retards it and brings it to a state of momentary rest, as in Fig. 7, which is the limit of its inward or printing movement. During the next quarter-revolution of the pocket 1 it will continue to move the stud 6 in the curved or crank pathway formed by the guard 2 and move the stud 7 in the reversed curved pathway in the arm 40, thus starting the bed in the reverse direction and gradually accelerating it through a compound motion, causing it to move in the direction of the horizontal arrow in Fig. 8, and when the pocket 1 is closely approaching and passing its highest point of travel and the head of the guard 2 coincides with it, as in Fig. 8, at which time said pocket, the rack 22, and stud 6 are moving at the same surface speed as the driving-pinions 10 11, the rack 22 will engage the pinion 11, which has then moved into proper alignment with it, and the stud 6 will simultaneously disengage from the pocket 1 and pass out from the head of the guard 2. The bed will then have been reversed and will be carried through the major part of its non-printing movement, during which it will be solely driven by the pinion 11 through the rack 22 while the pinion 10 makes one revolution, the stud 6 then moving free and being carried with the bed. At the end of the major part of this non-printing movement the parts will have arrived in the positions of Fig. 9, ready for reversal, and the operation described will be repeated.

The guard-disk is provided with a duplicate guard 4, arranged opposite to the guard 2, which latter has been described as the "active" guard. When the active guard, as 2, is disabled or worn, the guard, as 4, may replace it by slipping the gears, and at all times the inactive guard acts as a counter-balance for the active guard.

It is only necessary to add that the cam 26 operates during the time consumed by the reversing operation at each end of the run of the bed to slide the pinion 11 laterally and bring it into alignment with the proper rack with which it is to next thereafter engage.

Herein the rack-and-pinion mechanism embodies two racks and a single pinion. It is obvious that other constructions may be used, as is explained and illustrated in my application, Serial No. 421,914, filed February 8, 1892.

It may now be stated that the curved guide 30 or 40 may, instead of having a slot, be a single member, against which the stud, as 5 or 7, bears, or that it might be embraced by a stud bearing on its opposite sides. It may also be remarked that, while such curved guides may be entirely omitted, their use is preferred.

Of course the pocket-disk might be an arm of dimensions sufficient to carry the semicircular pocket 1, and the terms "pocket," "disk," or "pocket-disk" are therefore to be regarded as embracing such a construction, and since to attain its normal position, as in Figs. 6 and 9, it is always the same end of the lever which must be depressed, that end might be given a preponderance of weight as a substitute for the spring-rods; but the latter are more positive and certain in action, and therefore preferred.

The lever might be divided so as to constitute two levers separately pivoted to the bed and geared together, so as to be automatically operated to bring their ends into correct positions for their repeated operation. This is shown in my application, Serial No. 432,362, filed May 9, 1892, and therefore is only claimed herein as covered by the broad scope of the claims.

It will be obvious that this invention is applicable in part or in whole wherever a reciprocating member is employed in machines other than printing-machines—as, for instance, in a planer.

What is claimed is—

1. The combination, with the moving bed, of a swinging lever hung to the bed, a revolving disk having a pocket, and a revolving guard co-operating with said pocket to engage the end of said lever and reverse the movement of the bed by retarding, stopping, starting, and accelerating the same by a crank-like motion, substantially as described.

2. The combination, with the reciprocating bed, of a swinging lever hung to the bed, a revolving disk having a pocket, and a revolving guard co-operating with said pocket to alternately engage opposite ends of said lever and reverse the movement of the bed at each end of its run by retarding, stopping, starting, and accelerating the same by a crank-like motion, substantially as described.

3. The combination, with the moving bed, of a swinging lever hung to the bed, a revolving disk having a pocket, a revolving guard coacting with said pocket to engage the end of said lever, and a curved guide in which said lever end travels, whereby the travel of the bed is reversed by retarding, stopping, starting, and accelerating the same through a compound movement, substantially as described.

4. The combination, with the reciprocating bed, of a swinging lever hung to the bed, a revolving disk having a pocket, a revolving guard coacting with said pocket to alternately engage opposite ends of said lever, and a curved guide at each end of the bed, in which the opposite ends of the lever travel, whereby the motion of the bed is reversed at each end of its run by retarding, stopping, starting, and accelerating the same through compound movements, substantially as described.

5. The combination, with the bed and a rack-and-pinion mechanism for driving it during the major part of its run in either direction, of a swinging lever hung to the bed, a revolving disk having a pocket, and a revolving guard co-operating with said pocket to engage the end of said lever and reverse the movement of the bed by retarding, stopping, starting, and accelerating the same by a crank-like motion, substantially as described.

6. The combination, with the bed and a rack-and-pinion mechanism for driving it during the major part of its reciprocation, of a swinging lever hung to the bed, a revolving disk having a pocket, and a revolving guard co-operating with said pocket to alternately engage opposite ends of said lever and reverse the movement of the bed at each end of its run by retarding, stopping, starting, and accelerating the same by a crank-like motion, substantially as described.

7. The combination, with the bed and a rack-and-pinion mechanism for driving it in either direction, of a swinging lever hung to the bed, a revolving disk having a pocket, a revolving guard coacting with said pocket to engage the end of said lever, and a curved guide in which said lever end travels, whereby the travel of the bed is reversed by retarding, stopping, starting, and accelerating the same through a compound movement, substantially as described.

8. The combination, with the bed and a rack-and-pinion mechanism for driving it during the major part of its reciprocation, of a swinging lever hung to the bed, a revolving disk having a pocket, a revolving guard co-acting with said pocket to alternately engage opposite ends of said lever, and a curved guide at each end of the bed, in which the opposite ends of the lever travel, whereby the travel of the bed is reversed at each end of its run by retarding, stopping, starting, and accelerating the same through compound movements, substantially as described.

9. The combination, with the revolving pocket-disk P and revolving guard 2, of the bed B, rocking lever L, and spring-rods 31 32, substantially as described.

10. The combination, with the pinion-racks 21 22, pinion 11, revolving pocket-disk P, and cam 26, of means coupling said cam and pinion and gearing connecting the said pinion and disk, whereby timely relative co-operation is accomplished, substantially as described.

11. The combination, with the pocket-disk, guard-disk, pinion 10, and shaft 12, of gearing connecting the two and proportioned to impart to said disks differential rotative movements, substantially as described.

In testimony whereof I have hereunto set my hand in the presence of two subscribing witnesses.

LUTHER C. CROWELL.

Witnesses:
NATHANIEL ATWOOD,
G. R. STEDMAN.